(12) United States Patent
Kang et al.

(10) Patent No.: US 9,485,665 B2
(45) Date of Patent: Nov. 1, 2016

(54) NETWORK MANAGEMENT APPARATUS FOR PRIORITY CHANNEL ASSIGNMENT TO ACQUIRE AVAILABLE CHANNELS IN FREQUENCY SHARING AND METHOD THEREOF

(71) Applicant: Electronics and Telecommunications Research Institute, Daejeon (KR)

(72) Inventors: Kyu Min Kang, Daejeon (KR); Jae Cheol Park, Daejeon (KR); Dong Hun Lee, Daejeon (KR); Byung Jang Jeong, Daejeon (KR)

(73) Assignee: ELECTRONICS AND TELECOMMUNICATIONS RESEARCH INSTIT, Daejeon (KR)

( * ) Notice: Subject to any disclaimer, the term of this patent is extended or adjusted under 35 U.S.C. 154(b) by 134 days.

(21) Appl. No.: 14/478,303

(22) Filed: Sep. 5, 2014

(65) Prior Publication Data
US 2015/0312912 A1 Oct. 29, 2015

(30) Foreign Application Priority Data
Apr. 24, 2014 (KR) ........................ 10-2014-0049502

(51) Int. Cl.
*H04W 72/00* (2009.01)
*H04W 16/14* (2009.01)

(52) U.S. Cl.
CPC .................................. *H04W 16/14* (2013.01)

(58) Field of Classification Search
CPC ..... H04W 16/14; H04W 72/06; H04W 4/12; H04M 19/04; H04M 1/57; H04M 1/6505; H04M 1/72519; H04M 2250/74
USPC ................ 455/434, 501, 454, 3.01; 702/111; 370/329, 338, 328
See application file for complete search history.

(56) References Cited

U.S. PATENT DOCUMENTS

| 7,528,751 B2 | 5/2009 | Park et al. |
| 7,710,919 B2 | 5/2010 | Woo et al. |
| 8,983,514 B2 * | 3/2015 | Lee ........................ H04W 48/08 370/328 |

(Continued)

FOREIGN PATENT DOCUMENTS

| KR | 1020070043604 A | 4/2007 |
| KR | 1020100060683 A | 6/2010 |

OTHER PUBLICATIONS

H.S. Jeon et al., MIH Based Broadcast and Mobile Convergence Service Standardization.

*Primary Examiner* — David Q Nguyen
(74) *Attorney, Agent, or Firm* — William Park & Associates Ltd.

(57) ABSTRACT

Disclosed is a network management apparatus for priority channel assignment to acquire available channels in a frequency sharing band, including: a signal intensity measurer measuring a received signal intensity for an input signal; and a controller verifying usable candidate channels in the same channel and an adjacent channel of a TV band device (TVBD) for each predetermined frequency based on the measured received signal intensity, verifying available channels of the TVBD based on the verified usable candidate channels in the same channel and the adjacent channel, calculating the decreased number of available channels of the TVBD predicted for each channel after channel reassignment, and assigning channels to be reassigned based on the calculated decreased number of available channels of the TVBD.

20 Claims, 6 Drawing Sheets

(56) References Cited

U.S. PATENT DOCUMENTS

| | | |
|---|---|---|
| 2007/0091998 A1 | 4/2007 | Woo et al. |
| 2011/0164580 A1* | 7/2011 | Keon ................ H04W 72/0453 370/329 |
| 2012/0243519 A1* | 9/2012 | Koskela ............ H04W 74/0816 370/338 |
| 2013/0016221 A1* | 1/2013 | Charbit ................ H04W 16/14 348/180 |
| 2013/0018622 A1* | 1/2013 | Samarasooriya ........ H04B 1/76 702/111 |
| 2013/0023202 A1* | 1/2013 | Koskela .................. H04W 4/06 455/3.01 |
| 2014/0018114 A1* | 1/2014 | Jo ......................... H04W 16/14 455/501 |
| 2014/0171072 A1* | 6/2014 | Kang .................... H04W 72/06 455/434 |

* cited by examiner

| 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 1 | 1 | 0 | 1 | 1 | 1 | 0 | 1 | 1 | 0 | 0 | 0 | 0 | 1 | 1 | 1 | 1 | 1 | 1 | 0 | 0 | 1 | 0 | 1 | 1 | 1 | 1 | 0 | 0 | 1 | 0 | 1 |

FIG. 4

| 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 1 | 1 | 0 | 1 | 1 | 1 | 1 | 1 | 1 | 0 | 0 | 1 | 0 | 1 | 1 | 1 | 1 | 1 | 1 | 0 | 1 | 1 | 0 | 1 | 1 | 1 | 1 | 0 | 0 | 1 | 0 | 1 |

| 52 | 53 | 54 | 55 | 56 | 57 | 58 | 59 | 60 | 61 | 62 | 63 | 64 | 65 | 66 | 67 | 68 | 69 |
|----|----|----|----|----|----|----|----|----|----|----|----|----|----|----|----|----|----|
|    |    |    |    |    |    |    | 0  | 0  | 0  | 0  | 0  | 0  | 0  |    |    |    |    |

FIG. 8

| 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|----|----|----|----|----|----|----|----|----|----|----|----|----|----|----|----|----|----|----|----|----|----|----|----|----|----|----|----|----|----|----|----|----|----|----|----|----|----|
|    |    |    | 1  | 1  | 1  | 1  | 1  | 1  | 2  | 2  | 2  | 2  | 2  | 1  | 1  | 0  | 0  | 1  | 2  | 3  | 3  | 2  | 2  | 1  | 1  | 0  | 0  | 1  | 2  | 2  | 1  |    |    |    | 0  | 0  | 0  |

FIG.9

NETWORK MANAGEMENT APPARATUS FOR PRIORITY CHANNEL ASSIGNMENT TO ACQUIRE AVAILABLE CHANNELS IN FREQUENCY SHARING AND METHOD THEREOF

CROSS-REFERENCE TO RELATED APPLICATIONS

This application claims priority to and the benefit of Korean Patent Application No. 10-2014-0049502 filed in the Korean Intellectual Property Office on Apr. 24, 2014, the entire contents of which are incorporated herein by reference.

TECHNICAL FIELD

The present invention relates to a network management apparatus for priority channel assignment to acquire available channels in a frequency sharing band and a method thereof, and particularly, to a network management apparatus for priority channel assignment to acquire available channels in the frequency sharing band, which provides a channel priority assignment method considering a channel change which is available in a device having a low priority and a method thereof.

BACKGROUND ART

As unlicensed use for a TV frequency band which is not used and is empty, which is called a TV white space (TVWS) is permitted by the Federal Communication Commission (FCC), a research into spectrum sharing technology in a corresponding frequency band is in progress worldwide.

In order to use a TV band device (TVBD) which is a TV band wireless device in a channel which is the same as or adjacent to a channel used by a DTV which is a primary user in the TV band, the TVBD needs to be operated with a predetermined protection spacing distance from a DTV service boundary point. As described above, the number of available channels which are usable in a frequency sharing band by the TVBD which is a secondary user is determined according to the number of channels presently used by the DTV which is the primary user, the protection spacing distance, and the like.

In the case of a broadcasting service which is the primary user, a case where the channel needs to be reassigned for an efficient operation of a system and frequency rearrangement occurs. In this case, since the number of available channels which are usable by the TVBD which is the secondary user is not considered, inefficiency upon channel reassignment is increased.

SUMMARY OF THE INVENTION

The present invention has been made in an effort to provide a network management apparatus for priority channel assignment to acquire available channels in a frequency sharing band, which assigns, by priority, a channel so as to less decrease the number of available channels for a secondary user (alternatively, a terminal/a device) having a low priority when the channel needs to be reassigned for efficient operation of a system and frequency rearrangement like a broadcasting service, and a method thereof.

The present invention has been made in an effort to provide a network management apparatus for priority channel assignment to acquire available channels in a frequency sharing band, which provides an optimal channel priority assignment method considering a change of a channel which is usable by a secondary service user (alternatively, a terminal/a device) having relatively a low priority so as to be used when a channel needs to be, by priority, assigned for a primary service or a secondary service having a high priority for using a corresponding frequency in a frequency band which has been used or may be used as a frequency sharing band, and a method thereof.

An exemplary embodiment of the present invention provides a network management apparatus for priority channel assignment to acquire available channels in a frequency sharing band, including: a signal intensity measurer measuring a received signal intensity for an input signal; and a controller verifying usable candidate channels in the same channel and an adjacent channel of a TV band device (TVBD) for each predetermined frequency based on the measured received signal intensity, verifying available channels of the TVBD based on the verified usable candidate channels in the same channel and the adjacent channel, calculating the decreased number of available channels of the TVBD predicted for each channel after channel reassignment, and assigning channels to be reassigned based on the calculated decreased number of available channels of the TVBD.

The apparatus may further include: a receiver receiving the input signal transferred from a DTV transmission station and converting the received input signal into a baseband signal; and an A/D converter converting the converted analog baseband signal into a digital signal.

The controller may judge whether the measured received signal intensity for each predetermined frequency is less than a predetermined first threshold value and verify usable candidate channels in the same channel based on the judgment result.

The controller may judge whether the measured received signal intensity for each predetermined frequency is less than a predetermined second threshold value and verify usable candidate channels in the adjacent channel based on the judgment result.

The controller may verify whether previous and subsequent channels of an adjacent channel of a channel to be used in the same channel are usable and when both the previous and subsequent channels of the adjacent channel are usable as the verification result, the controller may judge the channels as channels usable as TV white space (TVWS).

The controller may calculate the number of channels in which a channel reassignment candidate channel and previous and subsequent channels of the channel reassignment candidate channel are usable in the verified available channels of the TVBD to calculate the decreased number of available channels of the TVBD.

The controller may verify the channel reassignment candidate channel through at least one of a simulation result and TV transmission station associated information prestored in a database.

The controller may judge whether the measured received signal intensity for each predetermined frequency is less than a predetermined third threshold value and verify whether a DTV uses the channel based on the judgment result.

The controller may reassign the channels to be reassigned in the order from a channel in which the calculated decreased number of available channels of the TVBD is smallest among the channel reassignment candidate channels in the verified available channels of the TVBD.

The controller may reassign, by priority, the channels to be reassigned to channels which are consecutively contiguous when a plurality of channels in which the calculated decreased numbers of available channels of the TVBD are the same as each other is provided.

Another exemplary embodiment of the present invention provides a network management method for priority channel assignment to acquire available channels in a frequency sharing band, including: measuring, by a signal intensity measurer, a received signal intensity for an input signal; verifying, by a controller, usable candidate channels in the same channel and an adjacent channel of a TV band device (TVBD) for each predetermined frequency based on the measured received signal intensity; verifying, by the controller, available channels of the TVBD based on the verified usable candidate channels in the same channel and the adjacent channel; calculating, by the controller, the decreased number of available channels of the TVBD predicted for each channel after channel reassignment; and assigning, by the controller, channels to be reassigned based on the calculated decreased number of available channels of the TVBD.

The method may further include: receiving, by a receiver, the input signal transferred from a DTV transmission station and converting the received input signal into a baseband signal; and converting, by an A/D converter, the converted analog baseband signal into a digital signal and providing the converted digital signal to the signal intensity measurer.

The verifying, by the controller, of usable candidate channels in the same channel and an adjacent channel of a TVBD for each predetermined frequency may include judging, by the controller, whether the measured received signal intensity for each predetermined frequency is less than a predetermined first threshold value, verifying that the channel is the usable candidate channel in the same channel when the measured received signal intensity is less than the first threshold value based on the judgment result, and verifying that the corresponding channel is unusable in the same channel when the measured received signal intensity is equal to or more than the first threshold value based on the judgment result.

The verifying, by the controller, of usable candidate channels in the same channel and an adjacent channel of a TVBD for each predetermined frequency may include judging, by the controller, whether the measured received signal intensity for each predetermined frequency is less than a predetermined second threshold value, verifying that the channel is the usable candidate channel in the adjacent channel when the measured received signal intensity is less than the second threshold value based on the judgment result, and verifying that the corresponding channel is unusable in the adjacent channel when the measured received signal intensity is equal to or more than the second threshold value based on the judgment result.

The verifying, by the controller, of usable candidate channels in the same channel and an adjacent channel of a TVBD for each predetermined frequency may include verifying usable candidate channels in the same channel of the usable TVBD after applying a predetermined same channel protection spacing distance to the DTV based on the received signal intensity measured, and verifying usable candidate channels in the adjacent channel of the usable TVBD after applying a predetermined adjacent channel protection spacing distance to the DTV based on the received signal intensity measured.

The verifying of the available channels of the TVBD may include verifying whether previous and subsequent channels of an adjacent channel of a channel to be used in the same channel are usable, and judging the channels as channels usable as TV white space (TVWS) when both the previous and subsequent channels of the adjacent channel are usable as the verification result.

The method may further include: verifying, by the controller, channel reassignment candidate channels depending on use of a DTV; and verifying, by the controller, the channels to be assigned.

In the calculating of the decreased number of the available channels of the TVBD, the number of channels may be calculated, in which a channel reassignment candidate channel and previous and subsequent channels of the channel reassignment candidate channel are usable in the verified available channels of the TVBD. In the assigning of the channels to be reassigned, the channels to be reassigned may be reassigned in the order from a channel in which the calculated decreased number of available channels of the TVBD is smallest among the channel reassignment candidate channels in the verified available channels of the TVBD.

In the assigning of the channel to be reassigned, the channels to be reassigned may be, by priority, reassigned to channels which are consecutively contiguous when a plurality of channels in which the calculated decreased numbers of available channels of the TVBD are the same as each other is provided.

A network management apparatus for priority channel assignment to acquire available channels in a frequency sharing band and a method thereof according to exemplary embodiments of the present invention assign, by priority, a channel so as to less decrease the number of available channels for a secondary user (alternatively, a terminal/a device) having a low priority when the channel needs to be reassigned for efficient operation of a system and frequency rearrangement like a broadcasting service to acquire as many available channels in a frequency sharing band as possible and efficiently use limited frequency resources.

A network management apparatus for priority channel assignment to acquire available channels in a frequency sharing band and a method thereof according to exemplary embodiments of the present invention, provide an optimal channel priority assignment method considering a change of a channel which is usable by a secondary service user (alternatively, a terminal/a device) having a relatively low priority so as to be used when a channel needs to be, by priority, assigned for a primary service or a secondary service having a high priority for using a corresponding frequency in a frequency band which has been used or may be used as a frequency sharing band to improve network operation efficiency of the secondary service user having the low priority.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is noted that technical terms used in the present invention are used to just describe a specific exemplary embodiment and do not intend to limit the present invention. Unless otherwise defined in the present invention, the technical terms used in the present invention should be interpreted as meanings generally appreciated by those skilled in the art and should not be interpreted as excessively comprehensive meanings or excessively reduced meanings. When the technical term used in the present invention is a wrong technical term that does not accurately express the spirit of the present invention, the technical term should be understood by being substituted by a technical term which can be correctly understood by those skilled in the art. A general term used in the present invention should be interpreted as defined in a dictionary or contextually, and should not be interpreted as an excessively reduced meaning.

Unless otherwise apparently specified contextually, a singular expression used in the present invention includes a plural expression. In the present invention, a term such as "comprising" or "including" should not be interpreted as necessarily including all various components or various steps disclosed in the invention, and it should be interpreted that some component or some steps among them may not be included or additional components or steps may be further included.

Terms including ordinal numbers, such as 'first' and 'second', used in the present invention can be used to describe various components, but the components should not be limited by the terms. The above terminologies are used only for distinguishing one component from the other components. For example, a first component may be named a second component and similarly, the second component may also be named the first component, without departing from the scope of the present invention.

Hereinafter, exemplary embodiments of the present invention will be described in detail with reference to the accompanying drawings, in which like reference numerals refer to like or similar elements regardless of reference numerals and a duplicated description thereof will be omitted.

In describing the present invention, when it is determined that the detailed description of the publicly known art related to the present invention may obscure the gist of the present invention, the detailed description thereof will be omitted. It is noted that the accompanying drawings are only for easily understanding the spirit of the present invention and it should not be interpreted that the spirit of the present invention is limited by the accompanying drawings.

Figure 1:
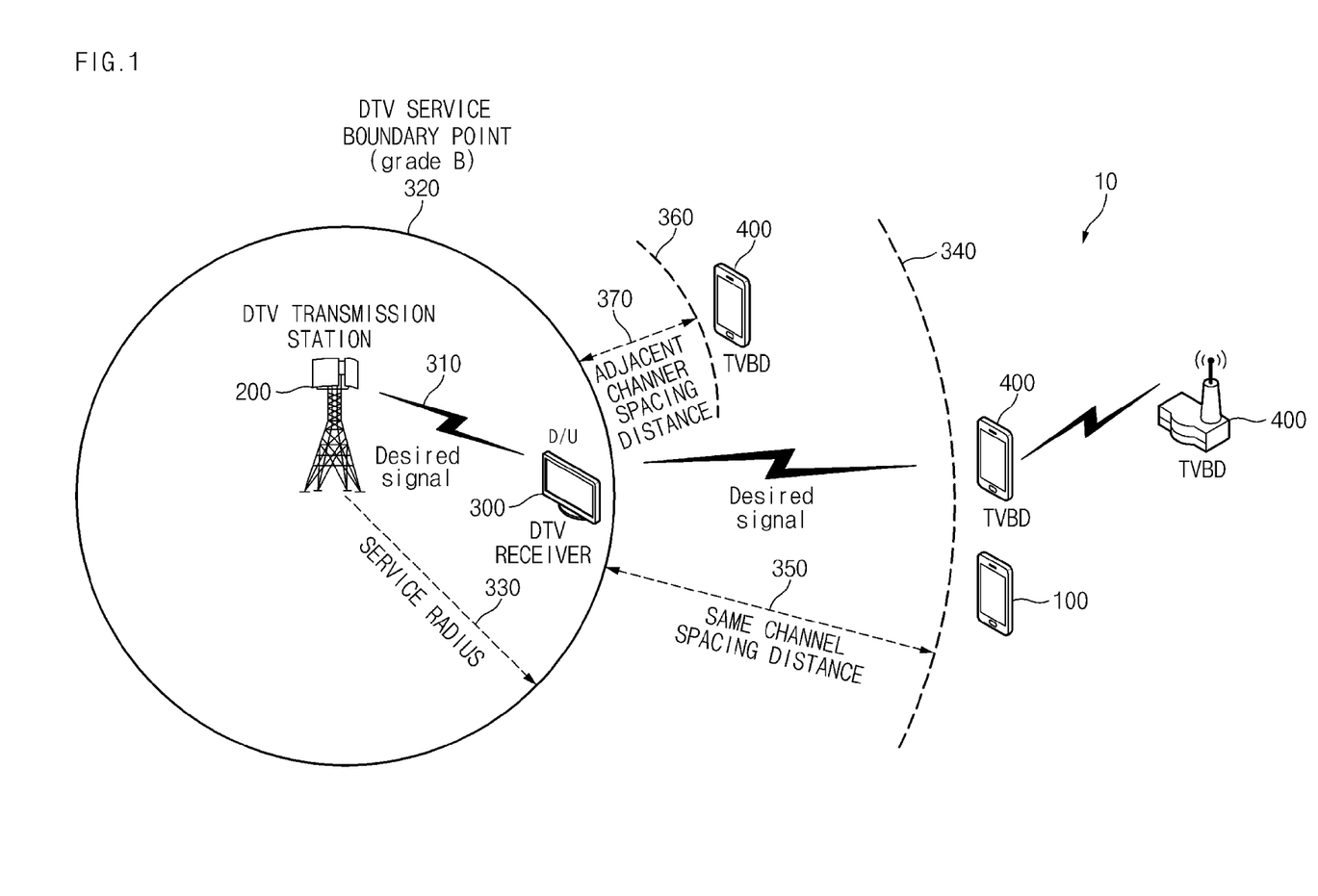
FIG. 1 is a configuration diagram of a broadcasting system to which a network management apparatus according to an exemplary embodiment of the present invention is applied.

FIG. 1 is a configuration diagram of a broadcasting system 10 to which a network management apparatus 100 according to an exemplary embodiment of the present invention is applied.

As illustrated in FIG. 1, the broadcasting system 10 includes a network management apparatus 100, a DTV transmission station 200, a DTV 300, and a TVBD 400. All constituent elements of the broadcasting system 10 illustrated in FIG. 1 are not required, and the broadcasting system 10 may be implemented by more or fewer constituent elements than the constituent elements illustrated in FIG. 1.

In reallocating one or more channel reallocation candidate channels to one or more usable candidate channels among a plurality of channels, the network management apparatus 100 verifies the usable candidate channel in the same channel and an adjacent channel of the TVBD 400 for each channel, verifies an available channel of the TVBD 400 based on the verified usable candidate channel in the same channel and the adjacent channel, verifies a channel reassignment candidate channel depending on using the DTV (alternatively, a DTV receiver) 300, verifies a channel (alternatively, a DTV channel) to be reassigned, which has a high priority and thereafter, calculates the decreased number of available channels of the TVBD 400 having a low priority anticipated for each channel after the channel reassignment based on verified information, and assigns the channel to be reassigned based on the calculated decreased number of available channels of the TVBD 400.

The DTV transmission station 200 transfers (alternatively, transmits/delivers) an input signal (alternatively, a broadcast signal) for each channel through an antenna (not illustrated). Herein, a service radius (alternatively, a DTV service boundary point/grade B level) of the input signal transferred through the DTV transmission station 200 is set according to a frequency characteristic of the corresponding input signal. In this case, the service radius may be changed depending on a propagation environment and a propagation policy of a country that operates the DTV. In the exemplary embodiment of the present invention, a point where a DTV received signal intensity is equal to or more than −84 dBm/6 MHz is assumed (alternatively, set) as a point where a DTV service may be provided.

Accordingly, since a protection spacing distance needs to be set differently depending on a type, an antenna height, and a used channel of the TVBD 400 to be operated, a maximum received signal level of the DTV which may be measured at a receiver of the TVBD 400 is also changed.

[Table 1] is an exemplary diagram illustrating a received signal level of a DTV signal which may be measured at a receiver of a fixed TVBD 400 operated in the same channel as the DTV (alternatively, the DTV receiver) 300 which is a primary service user depending on an antenna height of the fixed TVBD. Herein, [Table 1] is one exemplary diagram and a threshold value reference of the received signal intensity of the DTV may be more accurately predicted (alternatively, set) through an ultra high frequency (UHF) band propagation model and real environment measurement. In the exemplary embodiment of the present invention, it will be described that the same channel fixed TVBD follows the corresponding reference depending on the antenna height in [Table 1]. In the exemplary embodiment of the present invention, it will be described that the same channel or adjacent channel personal/portable TVBD and the adjacent channel fixed TVBD follow a reference which is less than 3 m in [Table 1].

TABLE 1

| Antenna height of TVBD | Threshold value of received signal intensity of DTV |
|---|---|
| Less than 3 m | <−85 dBm |
| 3 m to 10 m (equal to or more than 3 m and less than 10 m) | <−90 dBm |
| 10 m to 30 m (equal to or more than 10 m and less than 30 m) | <−94 dBm |

The DTV (alternatively, the DTV receiver) 300 receives the input signal (alternatively, the broadcast signal) transferred (alternatively, delivered) from the DTV transmission station 200. In this case, the DTV 300 is designed to receive a corresponding input signal up to a DTV service boundary point which is a point (grade B) 320 where a signal intensity (alternatively, a received signal intensity/signal level) of an input single 310 illustrated in FIG. 1 becomes approximately −84 dBm which is preset and the corresponding DTV 300 may receive the input signal 310 of the corresponding channel only when the corresponding DTV 300 is positioned within a service radius 330 where the signal intensity illustrated in FIG. 1 is equal to or more than −84 dBm/6 MHz.

In order for the DTV 300 positioned in the service radius 330 to normally receive the input signal, a desired-to-undesired signal power (D/U) ratio needs to be satisfied.

That is, when the TVBD 400 is intended to be operated by the same channel used by the DTV 300 in an adjacent region where the DTV service is provided, the TVBD 400 needs to be spaced from all DTVs 300 positioned within the service radius 330 by a sufficient distance 340 to satisfy the D/U ratio. In this case, the corresponding distance 340 is referred to as the same channel protection spacing distance 350 for protecting the DTV service.

When the TVBD 400 is intended to be operated in the adjacent channel used by the DTV 300 in the adjacent region where the DTV service is provided, the TVBD 400 needs to be spaced from all of the DTVs 300 positioned within the service radius 330 by a sufficient other distance 360 to satisfy the D/U ratio. In this case, the corresponding other distance 360 is referred to as an adjacent channel protection spacing distance 370 for protecting the DTV service.

The TV band device (TVBD) or the TVBD receiver 400 transmits and receives a signal by using an adjacent channel adjacent to a channel being used by the corresponding DTV 300 while being spaced from the DTV 300 by an adjacent spacing distance or more.

The TVBD 400 transmits and receives the signal by using the same channel which is the same as the channel being used by the corresponding DTV 300 while being spaced from the DTV 300 by the same channel spacing distance or more.

The TVBD 400 is positioned in the same region as the network management apparatus 100 or at a place spaced from the corresponding network management apparatus 100 by a predetermined gap. In this case, the TVBD 400 may be configured to include the network management apparatus 100.

When the TVBD 400 is positioned at the place spaced from the network management apparatus 100 by the predetermined gap, the TVBD 400 may receive the input single transferred from the DTV transmission station 200, measure (alternatively, sense) the signal intensity of the received input signal, and thereafter, transfer (alternatively, transmit) the signal intensity of the measured input signal to the network management apparatus 100.

Figure 2:
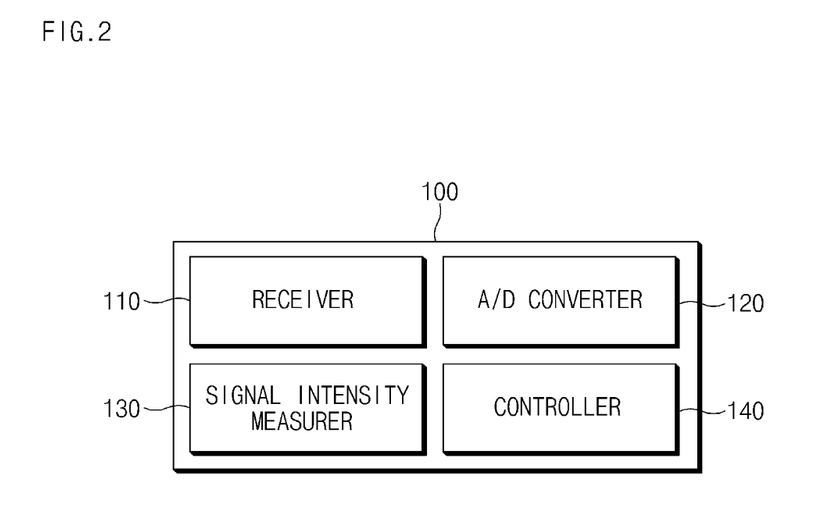
FIG. 2 is a configuration diagram of the network management apparatus according to the exemplary embodiment of the present invention.

As illustrated in FIG. 2, the network management apparatus 100 includes a receiver 110 an A/D converter 120, a signal intensity measurer 130, and a controller 140. All constituent elements of the network management apparatus 100 illustrated in FIG. 2 are not required, and the network management apparatus 100 may be implemented by more or fewer constituent elements than the constituent elements illustrated in FIG. 2.

The receiver 110 receives the input signal (alternatively, the broadcast signal/DTV signal) transferred (alternatively, transmitted/delivered) from the DTV transmission station 200.

The receiver 110 may receive the signal intensity of the input signal received from the TVBD 400, which is transferred from the TVBD 400.

The receiver 110 converts the received input signal into a baseband signal.

The receiver 110 transfers the input signal converted into the baseband signal to the A/D converter 120.

The analog-to-digital converter (A/D converter) 120 receives an analog input signal (alternatively, an input signal converted into the analog baseband signal) transferred from the receiver 110.

The A/D converter 120 converts the analog input signal (alternatively, the input signal converted into the baseband signal) into a digital signal.

The A/D converter 120 transfers the input signal converted into the digital signal to the signal intensity measurer 130.

The signal intensity measurer (alternatively, signal intensity sensor) 130 receives the input signal converted into the digital signal transferred from the A/D converter 120.

The signal intensity measurer 130 measures (alternatively, senses/calculates) the received signal intensity (alternatively, signal intensity/signal level) for the received digital signal.

The signal intensity measurer 130 transfers the received signal intensity for the measured digital signal to the controller 140.

The controller 140 executes an overall control function of the network management apparatus 100.

The controller 140 receives the received signal intensity for the digital signal transferred from the signal intensity measurer 130. In this case, the received signal intensity may be a received signal intensity for one or more channels or a plurality of channels.

The controller 140 verifies the usable candidate channel in the same channel and the usable candidate channel in the adjacent channel of the corresponding TVBD 400 for each predetermined frequency (alternatively, for each TV channel) based on the received signal intensity. In this case, in the same channel as or the adjacent channel to the channel which the corresponding TVBD 400 intends to operate, the DTV 300 which is the primary service user may be in an operating state.

That is, the controller 140 (alternatively, the TVBD 400 including the network management apparatus 100 including the corresponding controller 140) which is the secondary service user in the frequency sharing bandmeasures the received signal intensity (alternatively, the received signal level) of the signal of the DTV 300 which is the primary service user as illustrated in [Table 1] to judge whether the corresponding controller 140 (alternatively, the TVBD 400) sufficiently maintains the protection spacing distance for using the same channel or the adjacent channel. The controller 140 (alternatively, the TVBD 400) predicts (alternatively, verifies) an available channel in a predetermined first frequency band (for example, 470 MHz to 698 MHz corresponding to channel #14 to channel #51 which are set in advance). The controller 140 assigns, by priority, the channel so as to ensure many available channels in the frequency sharing band by considering a change of a channel which is available by a secondary service user at the time of reassigning a channel used in a predetermined second frequency band (for example, 699 MHz to 806 MHz corresponding to channel #52 to channel #69 which are set in advance).

In the exemplary embodiment of the present invention, the case in which the type of the TVBD 400 to be used is the fixed type and the height of the transmission antenna is equal to or more than 3 m and less than 10 m is described, but the present invention is not limited thereto and the height of the personal/portable and/or transmission antenna may be differently set with reference to [Table 1] according to design by a designer. An example will be described, in which as the DTV channel, channel #14 to channel #51 (38 channels) are usable and the DTV which is operated in channel #52 to channel #69 (18 channels) is reassigned to channels which are not used in channel #14 to channel #51. The available channel of the TVBD means a channel which is not regionally used by the DTV 300 and is empty in the same channel and the adjacent channel of the corresponding TVBD 400 after channel reassignment.

Figure 3:
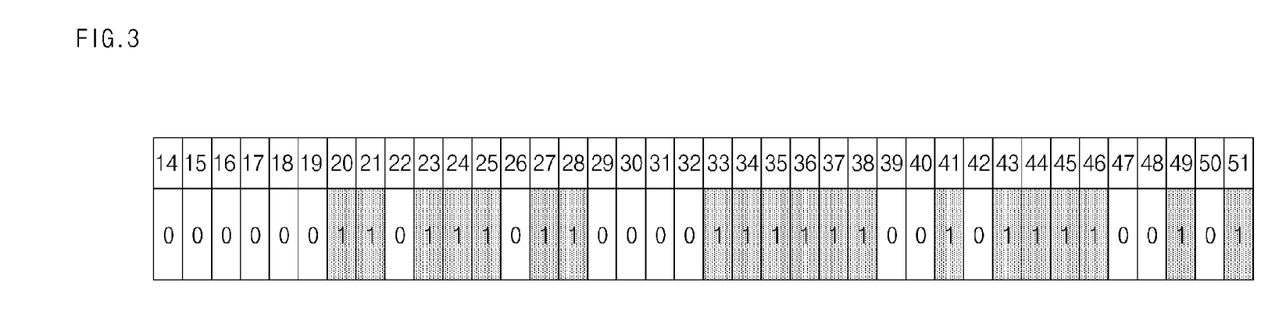
FIG. 3 is a diagram illustrating a usable candidate channel in the same channel of a TVBD according to an exemplary embodiment of the present invention.

As illustrated in FIG. 3, the controller 140 stores in a storage (not illustrated) a result acquired by verifying (alternatively, a result acquired by judging) whether the corresponding TVBD 400 (alternatively, the network management apparatus 100) is sufficiently spaced from the DTV service region so as to operate the TVBD 400 by using the channel which is the same as the channel being used by the DTV from the received signal intensity.

That is, the controller 140 sets (alternatively, selects) a first threshold value (alternatively, a first threshold value of the DTV received signal intensity) corresponding to the type and the transmission antenna height of the TVBD with reference to [Table 1]. The controller 140 records (alternatively, verifies/judges) '1' when the received signal intensity is measured as a value less than the corresponding first threshold value (for example, −90 dBm/6 MHz) and the TVBD 400 is the usable candidate channel and records (alternatively, verifies/judges) '0' when the DTV 300 which is the primary service user is being used and the received signal intensity is measured as a value equal to or more than the corresponding first threshold value. That is, the controller 140 arranges corresponding values as Co[i]=0 or 1 (i=14, 15, . . . , 51) to store the arranged values in the storage.

As described above, the controller 140 applies the same channel protection spacing distance according to the type and the transmission antenna height of the TVBD and thereafter, verifies that the corresponding TVBD 400 is the usable candidate channel (alternatively, the corresponding TVBD 400 is the usable candidate channel in the usable same channel) as illustrated in FIG. 3.

Figure 4:
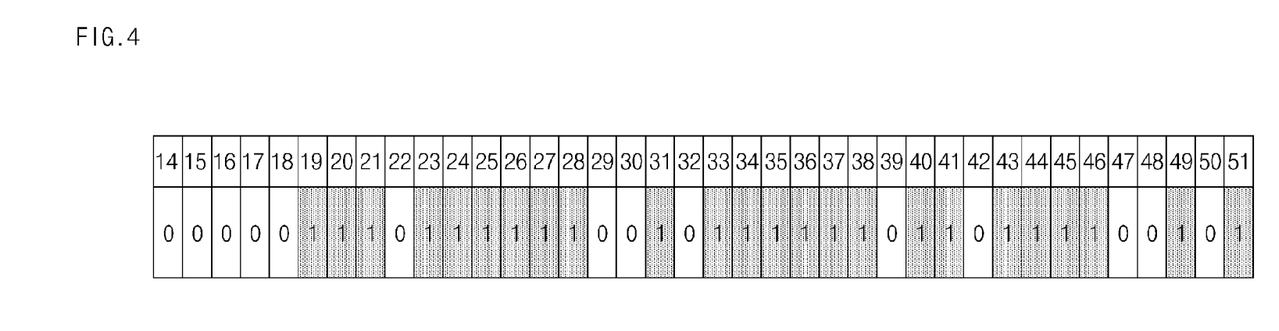
FIG. 4 is a diagram illustrating a usable candidate channel in an adjacent channel of a TVBD according to an exemplary embodiment of the present invention.

As illustrated in FIG. 4, the controller 140 stores in the storage a result acquired by verifying (alternatively, a result acquired by judging) whether the corresponding TVBD 400 (alternatively, the network management apparatus 100) is sufficiently spaced from the DTV service region so as to operate the TVBD 400 by using the channel which is adjacent to the channel being used by the DTV from the received signal intensity.

That is, the controller 140 sets a second threshold value (alternatively, a second threshold value of the DTV received signal intensity) corresponding to the type and the transmission antenna height of the TVBD with reference to [Table 1]. The controller 140 judges that there is no DTV signal when the received signal intensity is measured as a value less than the corresponding second threshold value (for example, −85 dBm/6 MHz) to record '1' and record the second threshold value as '0' when the received signal intensity is measured as a value equal to or more than the corresponding second threshold value. That is, the controller 140 arranges corresponding values as Adj[i]=0 or 1 (i=14, 15, . . . , 51) to store the arranged values in the storage.

As described above, the controller 140 applies an adjacent channel protection spacing distance according to the type and the transmission antenna height of the TVBD and thereafter, verifies that the corresponding TVBD 400 is the usable candidate channel (alternatively, the corresponding TVBD 400 is the usable candidate channel in the usable adjacent channel) as illustrated in FIG. 4.

The controller 140 verifies (alternatively, examines) the available channel of the corresponding TVBD 400 based on the usable candidate channel in the verified same channel and adjacent channel.

That is, the controller 140 applies the same channel protection spacing distance of FIG. 3 and thereafter, additionally verifies (alternatively, examines/judges) whether both Adj[i−1] and Adj[i+1] are 1 with reference to FIG. 4 in order to judge whether the primary service user is present in an adjacent channel of a channel to be used in the case of a usable candidate channel (alternatively when Co[i]=1). When both Adj[i−1] and Adj[i+1] are 1, the controller 140 judges that an i-th channel (alternatively, the DTV channel) is a channel usable as TV white space (TVWS). Herein, in the case of a first channel, i=14) or a final channel (for example, i=51), the controller 140 examines whether Adj[i−1] or Adj[i+1] is 1 by examining only one adjacent channel just adjacent thereto and judges whether the corresponding channel is the channel usable as the TVWS.

As described above, the controller 140 verifies (alternatively, examines) the channel usable by the corresponding TVBD 400 again after applying the adjacent channel protection spacing distance among usable candidate channels (for example, 20 channels having the value of '1' illustrated in FIG. 3) after applying the same channel protection spacing distance. The controller 140 may estimate the channel available by the TVBD 400 to be used in a corresponding region at which the controller 140 (alternatively, the TVBD 400) is positioned by observing the received signal intensity for each channel.

Figure 5:
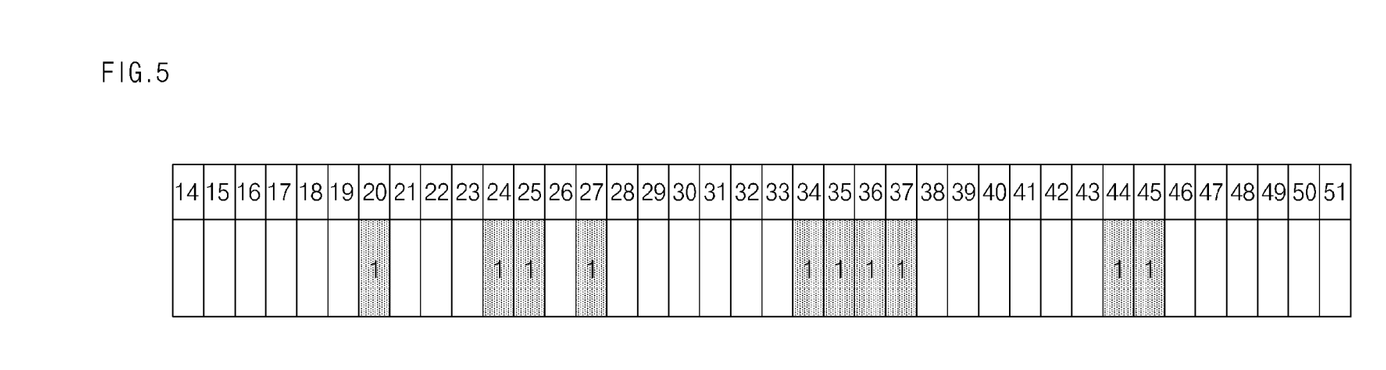
FIG. 5 is a diagram illustrating available channels of the TVBD according to the exemplary embodiment of the present invention.

As illustrated in FIG. 5, the controller 140 verifies the channels (for example, a total of 10 channels) available by the corresponding TVBD 400 and stores a verification result in the storage.

The controller 140 verifies a channel reassignment candidate channel (alternatively, a reassignment candidate channel) depending on use of the DTV 300. In this case, the controller 140 may verify the channel reassignment candidate channel depending on the use of the DTV 300 through a result of a simulation or information associated with the TV transmission station 200 stored in a database (not illustrated) in advance.

That is, when a received signal intensity of an input signal (alternatively, a DTV signal) received for each channel in a region to be reassigned with the channel is lower than a predetermined third threshold value, the controller 140 judges that the corresponding channel is a channel which may be, by priority, assigned because the DTV 300 does not use the corresponding channel at present to record RAM=1 (i=14, 15, . . . , 51). The controller 140 judges that the DTV 300 uses the corresponding channel at present to record RAM=0 when the received signal intensity is equal to or larger than the predetermined third threshold value.

Figure 6:
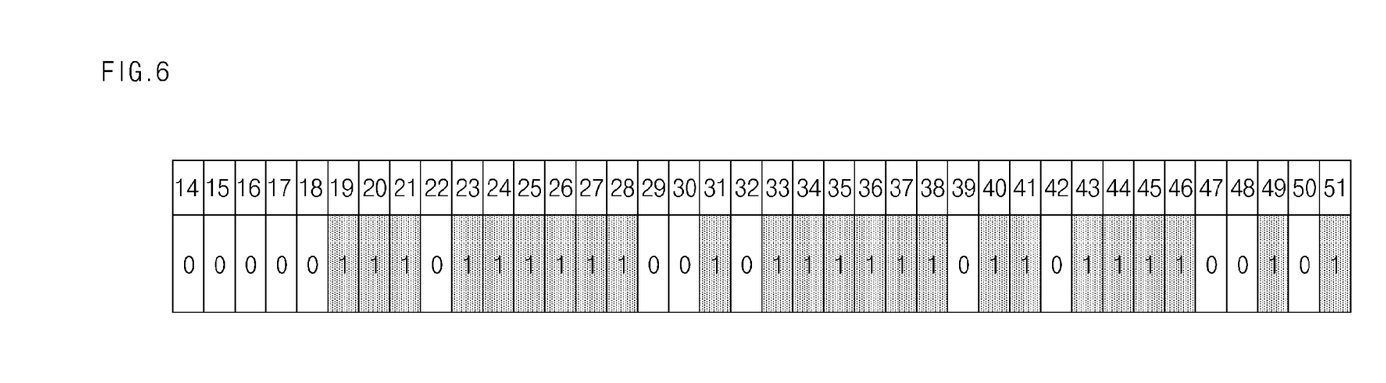
FIG. 6 is a diagram illustrating a channel reassignment candidate channel depending on using a DTV according to an exemplary embodiment of the present invention.

As illustrated in FIG. 6, the controller 140 verifies the channel reassignment candidate channel and stores the verified channel reassignment candidate channel (for example, a total of 24 channel reassignment candidate channels) in the storage.

The controller 140 verifies the channel (alternatively, a frequency/a DTV channel) to be reassigned.

Figure 7:
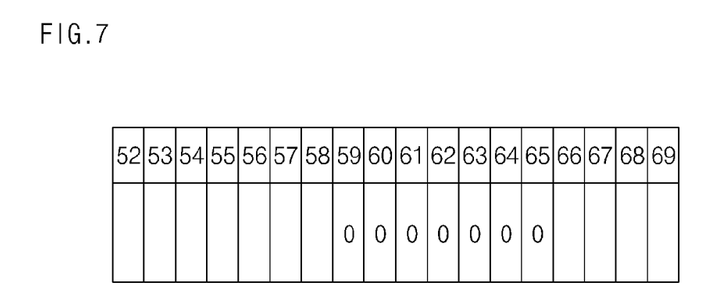
FIG. 7 is a diagram illustrating a channel to be reassigned according to the exemplary embodiment of the present invention.

For example, as illustrated in FIG. 7, the controller 140 assumes that the number of channels to be reassigned with channels is seven (for example, channel #59 to channel #65).

Referring to FIG. 6, the number of channels used by the DTV 300 at present among the total of 38 channels (for example, channel #14 to channel #51) is 14 (for example, the number of channels in which a set value is 0) and the number of channels which are not used and are empty is 24 (for example, the number of channels in which the set value is 1). When 7 channels (for example, channel #59 to channel #65) need to be reassigned as illustrated in FIG. 7, the controller 140 selects 7 channels among 24 channels which are not used and are empty in FIG. 6 and assigns 7 channels to be reassigned to the 7 selected channels as illustrated in FIG. 7. In this case, the number of channels usable by the TVBD 400 may be significantly decreased or not decreased depending on which channels among 24 channels the channels are reassigned to.

For example, when the DTV channel used in channel #61 illustrated in FIG. 7 is reassigned and used to channel #49 among 24 channels illustrated in FIG. 6, which are not used and are empty, the corresponding channel #49 is not available by the corresponding TVBD 400 with reference to FIG. 5, and as a result, the number of available channels depending on the channel reassignment is not changed.

On the contrary, when the DTV channel used in channel #61 illustrated in FIG. 7 is reassigned and used to channel #35 among 24 channels illustrated in FIG. 6, which are not used and are empty, the number of available channels which are usable by the corresponding TVBD 400 is decreased by 3 with reference to FIG. 5.

As described above, as the channel is reassigned, the number of available channels which are usable by TVBD 400 per reassigned channel is reduced by from 0 to 3.

Accordingly, in order for the DTV 300 which is the primary service user of FIG. 6 to reassign the DTV channel by well selecting 7 channels among 24 channels (that is, channel reassignment candidate channels) which are not used by the DTV 300 and are empty, the controller 140 needs to verify (alternatively, classify) a change in the number of available channels (alternatively, the decreased number of available channels) of the TVBD 400.

The controller 140 calculates (alternatively, counts/verifies) the decreased number of available channels of the TVBD 400 anticipated for each channel after the channel reassignment.

Figure 8:
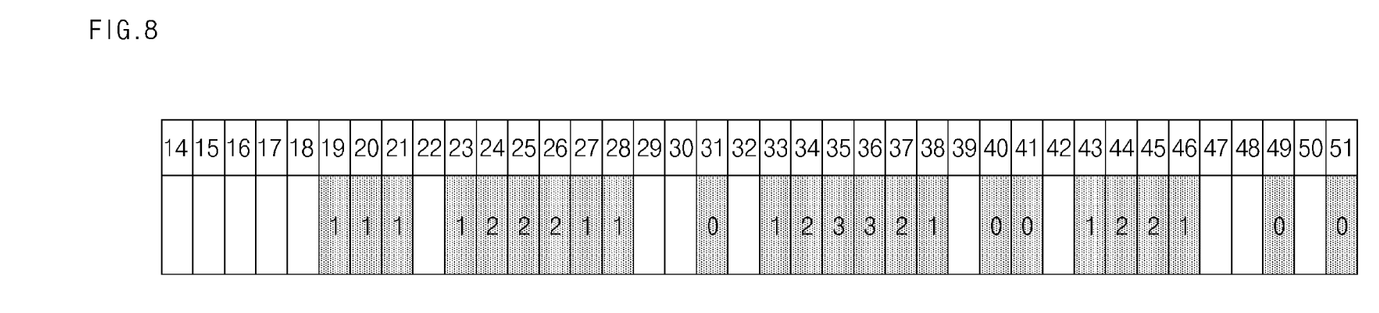
FIG. 8 is a diagram illustrating the decreased number of available channels of the TVBD anticipated for each channel after the channel reassignment according to the exemplary embodiment of the present invention.

That is, as illustrated in FIG. 8, the controller 140 calculates (alternatively, counts/verifies) the number of channels in which channel reassignment candidate channels and front and rear channels of the corresponding channel reassignment candidate channels are usable in the available channels of the corresponding TVBD 400 verified based on the verified channel reassignment candidate channels.

For example, as illustrated in FIG. 8, the controller 140 verifies 5 channels (for example, channels #31, #40, #41, #49, and #51) in which the decreased number of available channels is 0, 10 channels (for example, channels #19, #20, #21, #23, #27, #28, #33, #38, #43, and #46) in which the decreased number of available channels is 1, 7 channels (for example, channels #24, #25, #26, #34, #37, #44, and #45) in which the decreased number of available channels is 2, and 2 channels (for example, channels #35 and #36) in which the decreased number of available channels is 3 and stores the verified decreased numbers of available channels in the storage.

The controller 140 allocates channels to be reassigned based on the calculated decreased number of available channels of the TVBD 400.

That is, the controller 140 reassigns the channels in the order from the channel in which the decreased number (for example, the decreased number of available channels illustrated in FIG. 8) of available channels is small among channel reassignment candidate channels (for example, 24 channel reassignment candidate channels which are not used and are empty illustrated in FIG. 6) depending on the use of the DTV 300.

For example, among the 24 channel reassignment candidate channels illustrated in FIG. 6, the controller 140 reassigns, by priority, the channels to channels #31, #40, #41, #49, and #51 in which the decreased number of available channels illustrated in FIG. 8 is 0.

Subsequently, among the 24 channel reassignment candidate channels illustrated in FIG. 6, the controller 140 reassigns the channels to channels #19 and #20 in which the decreased number of available channels illustrated in FIG. 8 is 1. Herein, the controller 140 selects, by priority, channels (for example, channels #19 and #20) which are consecutively contiguous as illustrated in FIG. 8 and reassigns the channels to the channels selected by priority, at the time of reassigning the channels.

As described above, the decreased number of channels usable as the TVWS may be decreased by selecting the channels which are consecutively contiguous.

That is, when channels #19 and #20 are selected from 10 candidate channels in which the decreased number of available channels is 1 in FIG. 8, the controller 140 may not use channel #20 illustrated in FIG. 5, and as a result, the decreased number of channels usable as the TVWS is actually only 1. On the contrary, when channels #33 and #38 are selected from 10 candidate channels in which the decreased number of available channels is 1 in FIG. 8, the controller 140 may not use channels #34 and #37 illustrated in FIG. 5, and as a result, the decreased number of channels usable as the TVWS is 2.

When the channels are reassigned by such a method, the number of available channels usable by the TVBD 400 is decreased from 10 to 9 just by 1 although 7 channels used in channels #52 to #69 are reassigned to channels (for example, channels #19, #20, #31, #40, #41, #49, and #51) which are not regionally used at present and are empty among channels #14 to #51.

Additionally, for example, when the channels are reassigned to channels #20, #24, #27, #35, #36, #44, and #45 in which the decreased number of available channels of the TVBD 400 is to 1 to 3 among the 24 channel reassignment candidate channels in FIG. 8, no available channel usable by the TVBD 400 remains.

Accordingly, the controller 140 may reduce (alternatively, prevent) the decrease in the number of channels usable as the TVWS by selecting the channels which are consecutively contiguous.

As described above, in order for the controller 140 to perform actual channel reassignment, when the DTV signal is measured, which is positioned at a corresponding region at which the controller 140 (alternatively, the TVBD 400 including the controller 140) is positioned, there is a certain degree of difference in a received signal intensity for the input signal (alternatively, the DTV signal) depending on a reception point even in the same region, and as a result, the decreased number of available channels of the TVBD for each assigned channel depending on the channel reassignment exemplified in FIG. 8 may be anticipated (alternatively, verified) differently for each point. Accordingly, in the case where a technical feature according to the present invention is applied to actually reassign the channels, reliability may be increased when a predicted result is reflected and applied at various neighboring points.

In the exemplary embodiment of the present invention, the DTV (alternatively, the DTV service) as the primary service user (alternatively, the primary user service) is described and a broadcasting band is described as one example, but the present invention is not limited and the present invention may also be applied when the channel is, by priority, assigned for various types of primary services or the secondary service having a high priority in addition to the DTV service.

The method presented by the present invention is not limited to only the TVWS and may be applied in all frequency bands to efficiently use limited frequency resources through frequency sharing.

As described above, the channel may be, by priority, assigned so as to less decrease the number of available channels for a secondary user (alternatively, a terminal/a device) having a low priority when the channel needs to be reassigned for efficient operation of a system and frequency rearrangement like the broadcasting service.

As described above, there may be provided an optimal channel priority assignment method considering a change of a channel which is usable by a secondary service user (alternatively, a terminal/a device) having a relatively low priority so as to be used when a channel needs to be, by priority, assigned for a primary service or a secondary service having a high priority for using a corresponding frequency in a frequency band which has been used or may be used as a frequency sharing band.

Hereinafter, a network management method according to the present invention will be described in detail with reference to FIGS. 1 to 9.

Figure 9:
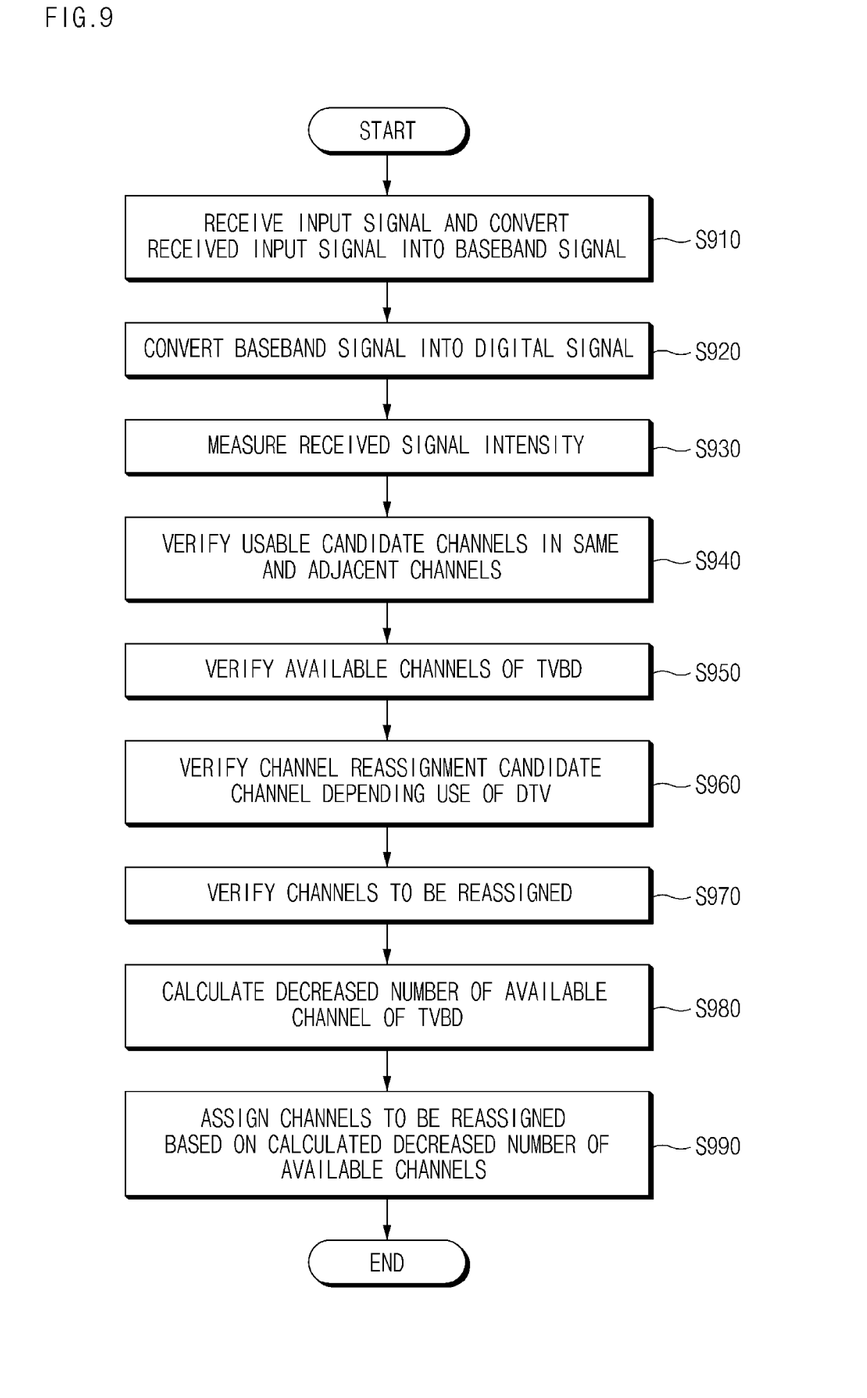
FIG. 9 is a flowchart illustrating a network management method according to an exemplary embodiment of the present invention.

FIG. 9 is a flowchart illustrating a network management method according to an exemplary embodiment of the present invention.

First, a receiver 110 receives an input signal (alternatively, a broadcast signal/a DTV signal) transferred (alternatively, transmitted) from a DTV transmission station 200. In this case, the receiver 110 may be positioned in the same region at which the TVBD 400 is positioned or at a place spaced from the corresponding TVBD 400 by a predetermined gap. When the receiver 110 and the corresponding TVBD 400 are spaced from each other by the predetermined gap, the receiver 110 may receive a signal intensity of the input signal transferred from the DTV transmission station 200 sensed by the corresponding TVBD 400, which is transferred from the TVBD 400. The receiver 110 (alternatively, a network management apparatus 100) may be configured in the corresponding TVBD 400.

The receiver 110 converts the received input signal into a baseband signal (S910).

Thereafter, an A/D converter 120 converts an analog input signal (alternatively, the input signal converted into the baseband signal) received through the receiver 110 into a digital signal (S920).

Thereafter, a signal intensity measurer (alternatively, a signal intensity sensor) 130 measures (alternatively, senses/calculates) the received signal intensity (alternatively, signal intensity/signal level) for the digital signal converted through the A/D converter 120. In this case, the signal intensity measurer 130 measures the received signal intensity for each corresponding digital signal for each predetermined frequency (alternatively, for each channel) (S930).

Thereafter, the controller 140 verifies usable candidate channels in the same channel and usable candidate channels in an adjacent channel of the corresponding TVBD 400 for each predetermined frequency (alternatively, for each TV channel) based on the received signal intensity measured through the signal intensity measurer 130. In this case, in the same channel as or the adjacent channel to the channel which the corresponding TVBD 400 intends to operate, a DTV (alternatively, a DTV receiver) 300 which is the primary service user may be in an operating state.

That is, the controller 140 verifies usable candidate channels in the same channel usable by the corresponding TVBD 400 after applying a predetermined same channel protection spacing distance to the DTV 300 based on the received signal intensity measured through the signal intensity measurer 130. The controller 140 verifies usable candidate channels in the adjacent channel usable by the corresponding TVBD 400 after applying a predetermined adjacent channel protection spacing distance to the DTV 300 based on the received signal intensity measured through the signal intensity measurer 130.

As one example, when a type of the TVBD 400 is a fixed type and the height of a transmission antenna is equal to or more than 3 m and less than 10 m, the controller 140 judges whether the corresponding TVBD 400 sufficiently maintains a protection spacing distance for using the same channel based on the received signal intensity measured through the signal intensity measurer 130, and arranges (alternatively, records) the corresponding judgment result.

That is, as illustrated in FIG. 3, the controller 140 judges that the TVBD 400 is the usable candidate channel to record '1' when the received signal intensity measured through the signal intensity measurer 130 for each predetermined frequency (alternatively, for each TV channel) is less than a predetermined first threshold value (for example, when the TVBD 400 is the fixed type and the height of the transmission antenna is equal to or more than 3 m and less than 10 m, the first threshold value is −90 dBm/6 MHz) and judges that the TVBD 400 is an unusable channel to record '0' when the measured received signal intensity is equal to or more than the predetermined first threshold value because the DTV 300 as the primary service user is using the corresponding channel. Accordingly, the usable candidate channels in the same channel illustrated in FIG. 3 may be 20 channels of #20, #21, #23, #24, #25, #27, #28, #33, #34, #35, #36, #37, #38, #41, #43, #44, #45, #46, #49, and #51.

As another example, when a type of the TVBD 400 is a fixed type and the height of a transmission antenna is equal to or more than 3 m and less than 10 m, the controller 140 judges whether the corresponding TVBD 400 sufficiently maintains a protection spacing distance for using the adjacent channel based on the received signal intensity measured through the signal intensity measurer 130, and arranges (alternatively, records) the corresponding judgment result.

That is, as illustrated in FIG. 4, the controller 140 judges that the TVBD 400 is the usable candidate channel to record '1' when the received signal intensity measured through the signal intensity measurer 130 for each predetermined frequency (alternatively, for each TV channel) is less than a predetermined second threshold value (for example, when the TVBD 400 is the fixed type and the height of the transmission antenna is less than 3 m, the second threshold value is −85 dBm/6 MHz) and judges that the TVBD 400 is an unusable channel to record '0' when the measured received signal intensity is equal to or more than the predetermined second threshold value because the DTV 300 as the primary service user is present in the corresponding adjacent channel. Accordingly, the usable candidate channels in the adjacent channel illustrated in FIG. 4 may be 24 channels of #19, #20, #21, #23, #24, #25, #26, #27, #28, #31, #33, #34, #35, #36, #37, #38, #40, #41, #43, #44, #45, #46, #49, and #51 (S940).

Thereafter, the controller 140 verifies (alternatively, examines) the available channel of the corresponding TVBD 400 based on the verified usable candidate channel in the same channel and adjacent channel.

That is, the controller 140 verifies whether previous and subsequent channels of the adjacent channel of the channel to be used in the corresponding same channel are usable in order to judge whether the DTV 300 as the primary service user is present in the adjacent channel of the channel to be used among usable candidate channels in the same channel and finally judges the previous and subsequent channels of the adjacent channel as the channels (alternatively, the available channels of the TVBD 400) usable as the TVWS when both the previous and subsequent of the adjacent channel are usable. As one example, the controller 140 verifies whether channels #19 and #21 of FIG. 4 corresponding to channel #20 illustrated in FIG. 3 are usable. As the verification result, since channels #19 and #21 of FIG. 4 are usable, the controller 140 sets channel #20 among the usable candidate channels in the same channel as the available channel usable in the corresponding TVBD 400 as illustrated in FIG. 5.

As another example, the controller 140 verifies whether channels #20 and #22 of FIG. 4 corresponding to channel #21 illustrated in FIG. 3 are usable. As the verification result, since channel #20 of FIG. 4 is usable, but channel #22 is not usable, the controller 140 verifies channel #21 among the usable candidate channels in the same channel as the channel which is not usable in the corresponding TVBD 400 (S950) as illustrated in FIG. 5.

Then, the controller 140 verifies a channel reassignment candidate channel depending on use of the DTV 300. In this case, the controller 140 may verify the channel reassignment candidate channel depending on the use of the DTV 300 through a result of a simulation or information associated with the TV transmission station 200 stored in a database (not illustrated) in advance.

That is, when a signal intensity (alternatively, a signal level) of an input signal (alternatively, a broadcast signal/a DTV signal) received for each channel in a region to be reassigned with the channel is lower than a predetermined third threshold value (for example, −84 dBm/6 MHz), the controller 140 judges that the corresponding channel is a channel which may be, by priority, assigned because the DTV 300 does not use the corresponding channel at present to record '1'. The controller 140 judges that the DTV 300 uses the corresponding channel at present to record '0' when the signal intensity of the input signal received for each corresponding channel is equal to or larger than the predetermined third threshold value.

As described above, the controller 140 verifies (alternatively, observes) whether the signal intensity of the received input signal is equal to or larger than the predetermined third threshold value (alternatively, a grade B level) to verify (alternatively, judge) whether the corresponding channel is used by the DTV 300 as the primary service user.

As one example, the controller 140 verifies the channel reassignment candidate channel depending on the use of the DTV 300 as illustrated in FIG. 6. In this case, the channel reassignment candidate channels illustrated in FIG. 6 may be 24 channels of #19, #20, #21, #23, #24, #25, #26, #27, #28, #31, #33, #34, #35, #36, #37, #38, #40, #41, #43, #44, #45, #46, #49, and #51 (S960).

Thereafter, the controller 140 verifies the channel (alternatively, a frequency/a DTV channel) to be reassigned.

As one example, the controller 140 verifies channels to be reassigned to channels #59 to #65 among a plurality of predetermined channels as illustrated in FIG. 7 (S970).

Thereafter, the controller 140 calculates (alternatively, counts/verifies) the decreased number of available channels of the TVBD 400 anticipated for each channel after the channel reassignment.

That is, the controller 140 calculates (alternatively, counts/verifies) the number of channels in which channel reassignment candidate channels and front and rear channels of the corresponding channel reassignment candidate channels are usable among the available channels of the corresponding TVBD 400 verified based on the verified channel reassignment candidate channels.

As one example, as illustrated in FIG. 8, the controller 140 verifies that the number of channels in which channel #19 and channels #20 and #21 which are previous and subsequent channels of the corresponding channel #19 are usable (for example, the channels having the value of '1') among the available channels of the TVBD 400 illustrated in FIG. 5 corresponding to channel #19 is 1 (for example, channel #20 has the value of '1') based on the channel reassignment candidate channel illustrated in FIG. 6.

As illustrated in FIG. 8, the controller 140 verifies that the number of channels in which channel #24 and channels #23 and #25 which are previous and subsequent channels of the corresponding channel #24 are usable among the available channels of the TVBD 400 illustrated in FIG. 5 for channel #24 is 2 (for example, channels #24 and #25 have the value of '1').

As described above, as illustrated in FIG. 8, the controller 140 verifies 5 channels (for example, channels #31, #40, #41, #49, and #51) in which the decreased number of available channels is 0, 10 channels (for example, channels #19, #20, #21, #23, #27, #28, #33, #38, #43, and #46) in which the decreased number of available channels is 1, 7 channels (for example, channels #24, #25, #26, #34, #37, #44, and #45) in which the decreased number of available channels is 2, and 2 channels (for example, channels #35 and

36) in which the decreased number of available channels is 3 (S980). Thereafter, the controller 140 allocates channels to be reassigned based on the calculated decreased number of available channels of the TVBD 400.

That is, the controller 140 reallocates the channels to be reassigned in the order from a channel in which the calculated decreased number of available channels of the TVBD 400 is smallest among the channel reassignment candidate channels depending on the verified use of the DTV 300. In this case, when a plurality of channels in which the decreased numbers of available channels of the TVBD 400 are the same as each other is provided, the controller 140 reassigns channels to be, by priority, reassigned to the channels which are consecutively contiguous among the plurality of channels in which the decreased numbers of available channels of the TVBD 400 are the same as each other.

As one example, when 7 channels such as channels #59 to #65 illustrated in FIG. 7 need to be reassigned, the controller 140 reassigns channels #59 to #63 to 5 channels (for example, channels #31, #40, #41, #49, and #51) in which the decreased number of available channels is smallest, that is, '0' in the decreased number of available channels illustrated in FIG. 8 among 24 channel reassignment candidate channels depending on the use of the DTV 300 illustrated in FIG. 6. Thereafter, the controller 140 reassigns channels #64 to #65 to 2 channels among 10 channels (for example, channels #19, #20, #21, #23, #27, #28, #33, #38, #43, and #46) in which the decreased number of available channels is '1' among the decreased numbers of available channels of the TVBD 400 illustrated in FIG. 8 among 24 channel reassignment candidate channels depending on the use of the DTV 300 illustrated in FIG. 6. In this case, in selecting 2 channels among the 10 channels in which the decreased number of available channels is '1', the controller 140 verifies channels (for example, #19, #20, #21, #27, and #28) which are consecutively contiguous among the plurality of channels in which the decreased numbers of available channels are the same as each other as '1' and reassigns the channels to former channels (for example, #19 and #20) among the verified consecutively contiguous channels. The controller 140 may reassign the channels to latter channels (#27 and #28) among the verified consecutively contiguous channels (S990).

As described above, according to the exemplary embodiments of the present invention, when the channel needs to be reassigned for efficient operation of a system and frequency rearrangement like the broadcasting service, the channel is, by priority, assigned so as to less decrease the number of available channels for the secondary user (alternatively, a terminal/a device) having a low priority to acquire as many available channels in the frequency sharing band as possible and efficiently use limited frequency resources.

As described above, according to the exemplary embodiments of the present invention, an optimal channel priority assignment method considering a change of a channel which is usable by a secondary service user (alternatively, a terminal/a device) having a relatively low priority so as to be used when a channel needs to be, by priority, assigned for a primary service or a secondary service having a high priority for using a corresponding frequency in a frequency band which has been used or may be used as a frequency sharing band is provided to improve the network operation efficiency of the secondary service user having a low priority.

Those skilled in the art can modify and change the above description within the scope without departing from an essential characteristic of the present invention. Accordingly, the embodiments disclosed herein are intended not to limit but to describe the technical spirit of the present invention, and the scope of the technical spirit of the present invention is not limited to the embodiments. The protection scope of the present invention should be interpreted by the appended claims and it will be analyzed that all the technical spirits in the equivalent range thereto are intended to be embraced by the claims of the present invention.

What is claimed is:

1. A network management apparatus for priority channel assignment to acquire available channels in a frequency sharing band, the apparatus comprising:
   a signal intensity measurer measuring a received signal intensity for an input signal; and
   a controller verifying usable candidate channels in the same channel and an adjacent channel of a TV band device (TVBD) for each predetermined frequency based on the measured received signal intensity, verifying available channels of the TVBD based on the verified usable candidate channels in the same channel and the adjacent channel, calculating the decreased number of available channels of the TVBD predicted for each channel after channel reassignment, and assigning channels to be reassigned based on the calculated decreased number of available channels of the TVBD.

2. The apparatus of claim 1, further comprising:
   a receiver receiving the input signal transferred from a DTV transmission station and converting the received input signal into a baseband signal; and
   an A/D converter converting the converted analog baseband signal into a digital signal.

3. The apparatus of claim 1, wherein the controller judges whether the measured received signal intensity for each predetermined frequency is less than a predetermined first threshold value and verifies usable candidate channels in the same channel based on the judgment result.

4. The apparatus of claim 1, wherein the controller judges whether the measured received signal intensity for each predetermined frequency is less than a predetermined second threshold value and verifies usable candidate channels in the adjacent channel based on the judgment result.

5. The apparatus of claim 1, wherein the controller verifies whether previous and subsequent channels of an adjacent channel of a channel to be used in the same channel are usable and when both the previous and subsequent channels of the adjacent channel are usable as the verification result, the controller judges the channels as channels usable as TV white space (TVWS).

6. The apparatus of claim 1, wherein the controller calculates the number of channels in which a channel reassignment candidate channel and previous and subsequent channels of the channel reassignment candidate channel are usable in the verified available channels of the TVBD to calculate the decreased number of available channels of the TVBD.

7. The apparatus of claim 1, wherein the controller verifies the channel reassignment candidate channel through at least one of a simulation result and TV transmission station associated information prestored in a database.

8. The apparatus of claim 7, wherein the controller judges whether the measured received signal intensity for each predetermined frequency is less than a predetermined third threshold value and verifies whether a DTV uses the channel based on the judgment result.

9. The apparatus of claim 1, wherein the controller reassigns the channels to be reassigned in the order from a channel in which the calculated decreased number of available channels of the TVBD is smallest among the channel reassignment candidate channels in the verified available channels of the TVBD.

10. The apparatus of claim 1, wherein the controller reassigns, by priority, the channels to be reassigned to channels which are consecutively contiguous when a plurality of channels in which the calculated decreased numbers of available channels of the TVBD are the same as each other is provided.

11. A network management method for priority channel assignment to acquire available channels in a frequency sharing band, the method comprising:
    measuring, by a signal intensity measurer, a received signal intensity for an input signal;
    verifying, by a controller, usable candidate channels in the same channel and an adjacent channel of a TV band device (TVBD) for each predetermined frequency based on the measured received signal intensity;
    verifying, by the controller, available channels of the TVBD based on the verified usable candidate channels in the same channel and the adjacent channel;
    calculating, by the controller, the decreased number of available channels of the TVBD predicted for each channel after channel reassignment; and
    assigning, by the controller, channels to be reassigned based on the calculated decreased number of available channels of the TVBD.

12. The method of claim 11, further comprising:
    receiving, by a receiver, the input signal transferred from a DTV transmission station and converting the received input signal into a baseband signal; and
    converting, by an A/D converter, the converted analog baseband signal into a digital signal and providing the converted digital signal to the signal intensity measurer.

13. The method of claim 11, wherein the verifying, by the controller, of usable candidate channels in the same channel and an adjacent channel of a TVBD for each predetermined frequency includes,
    judging, by the controller, whether the measured received signal intensity for each predetermined frequency is less than a predetermined first threshold value,
    verifying that the channel is the usable candidate channel in the same channel when the measured received signal intensity is less than the first threshold value based on the judgment result, and
    verifying that the channel is the corresponding channel is unusable in the same channel when the measured received signal intensity is equal to or more than the first threshold value based on the judgment result.

14. The method of claim 11, wherein the verifying, by the controller, of usable candidate channels in the same channel and an adjacent channel of a TVBD for each predetermined frequency includes
    judging, by the controller, whether the measured received signal intensity for each predetermined frequency is less than a predetermined second threshold value,
    verifying that the channel is the usable candidate channel in the adjacent channel when the measured received signal intensity is less than the second threshold value based on the judgment result, and
    verifying that the corresponding channel is unusable in the adjacent channel when the measured received signal intensity is equal to or more than the second threshold value based on the judgment result.

15. The method of claim 11, wherein the verifying, by the controller, of usable candidate channels in the same channel and an adjacent channel of a TVBD for each predetermined frequency includes
    verifying usable candidate channels in the same channel usable by the TVBD after applying a predetermined same channel protection spacing distance to the DTV based on the received signal intensity measured, and
    verifying usable candidate channels in the adjacent channel usable by the TVBD after applying a predetermined adjacent channel protection spacing distance to the DTV based on the received signal intensity measured.

16. The method of claim 11, wherein the verifying of the available channels of the TVBD includes
    verifying whether previous and subsequent channels of an adjacent channel of a channel to be used in the same channel are usable, and
    judging the channels as channels usable as TV white space (TVWS) when both the previous and subsequent channels of the adjacent channel are usable as the verification result.

17. The method of claim 11, further comprising:
    verifying, by the controller, channel reassignment candidate channels depending on use of a DTV; and
    verifying, by the controller, the channels to be reassigned.

18. The method of claim 11, wherein in the calculating of the decreased number of the available channels of the TVBD, the number of channels is calculated, in which a channel reassignment candidate channel and previous and subsequent channels of the channel reassignment candidate channel are usable in the verified available channels of the TVBD.

19. The method of claim 11, wherein in the assigning of the channels to be reassigned, the channels to be reassigned are reassigned in the order from a channel in which the calculated decreased number of available channels of the TVBD is smallest among the channel reassignment candidate channels in the verified available channels of the TVBD.

20. The method of claim 11, wherein in the assigning of the channel to be reassigned, the channels to be reassigned are, by priority, reassigned to channels which are consecutively contiguous when a plurality of channels in which the calculated decreased numbers of available channels of the TVBD are the same as each other is provided.

\* \* \* \* \*